United States Patent
Kawamura

(10) Patent No.: US 7,626,613 B2
(45) Date of Patent: Dec. 1, 2009

(54) IMAGE SENSING APPARATUS AND CONTROL METHOD THEREFOR

(75) Inventor: Masaru Kawamura, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 11/408,757

(22) Filed: Apr. 20, 2006

(65) Prior Publication Data

US 2006/0239654 A1   Oct. 26, 2006

(30) Foreign Application Priority Data

Apr. 21, 2005   (JP) .............................. 2005-123985

(51) Int. Cl.
*H04N 5/225* (2006.01)
*H04N 5/235* (2006.01)
*H04N 5/335* (2006.01)
*H04N 5/238* (2006.01)
*G03B 7/00* (2006.01)
*G03B 7/08* (2006.01)

(52) U.S. Cl. ................. 348/220.1; 348/221.1; 348/296; 348/363; 396/64; 396/235

(58) Field of Classification Search .............. 348/221.1, 348/229.1, 224.1, 208.12, 296, 362, 363, 348/220.1, 345, 346; 396/64, 235, 460, 505; 352/137, 204, 209, 216
See application file for complete search history.

(56) References Cited

U.S. PATENT DOCUMENTS

| | | | | |
|---|---|---|---|---|
| 5,847,756 | A * | 12/1998 | Iura et al. ................ | 348/220.1 |
| 6,141,499 | A * | 10/2000 | Ohmori et al. ............ | 396/63 |
| 6,157,406 | A * | 12/2000 | Iura et al. ................ | 348/220.1 |
| 6,359,649 | B1 * | 3/2002 | Suzuki .................... | 348/220.1 |
| 6,710,807 | B1 * | 3/2004 | Yamagishi ................ | 348/362 |
| 6,727,949 | B1 * | 4/2004 | Saruwatari et al. ......... | 348/349 |
| 6,798,448 | B1 * | 9/2004 | Motono et al. ........... | 348/222.1 |
| 6,992,720 | B2 * | 1/2006 | Kaneda .................... | 348/363 |
| 7,098,955 | B2 * | 8/2006 | Koyama et al. ........... | 348/363 |
| 2004/0263674 | A1 * | 12/2004 | Koreki ..................... | 348/345 |

FOREIGN PATENT DOCUMENTS

JP   10-136251 A   5/1998

(Continued)

OTHER PUBLICATIONS

Japanese Office Action issued on Aug. 15, 2008 concerning the basic Japanese Patent Application No. 2006-111367.

(Continued)

*Primary Examiner*—Tuan Ho
*Assistant Examiner*—Marly Camargo
(74) *Attorney, Agent, or Firm*—Canon U.S.A., Inc., IP Division

(57) ABSTRACT

Auto focus control processing for still image recording is performed while continuously performing movie recording when an initiation instruction for a still image recording preparation process is issued during movie recording. Movie recording is interrupted to perform still image recording processing only when an initiation instruction for still image recording processing is detected during movie recording. In addition, in the auto focus control for still image recording during movie recording, focus detection is performed within a distance range that is narrower than the distance range during auto focus control performed for normal still image recording.

5 Claims, 9 Drawing Sheets

FOREIGN PATENT DOCUMENTS

| | | |
|---|---|---|
| JP | 2004-198828 | 7/2004 |
| JP | 2004-201282 | 7/2004 |
| JP | 2005-37898 A | 2/2005 |
| JP | 2005-079814 A | 3/2005 |
| JP | 05-198068 | 7/2005 |

OTHER PUBLICATIONS

Office Action issued on Mar. 2, 2009 in counterpart Japanese Patent Application No. 2006-111367.

Corresponding Japanese office action; Nov. 25, 2008; re JP patent application 06-111367.

* cited by examiner

IMAGE SENSING APPARATUS AND CONTROL METHOD THEREFOR

FIELD OF THE INVENTION

The present invention relates to an image sensing apparatus capable of recording still images during movie recording, and a control method therefor.

BACKGROUND OF THE INVENTION

In recent years, due to the technical advancement of image sensing apparatuses using CCDs and other solid-state image sensors, as well as higher capacities and lower prices of semiconductor memory cards, digital video cameras with still image shooting capabilities and digital still cameras with movie shooting capabilities have become commonplace.

Furthermore, some image sensing apparatuses recently introduced to the market are not only capable of choosing between a movie shooting mode and a still image shooting mode to shoot either movies or still images under a chosen mode, but also capable of shooting still images during movie shooting without having to switch modes.

However, since movie shooting generally requires processing speeds of 30 frames per second, and individual frame images are not envisioned to be viewed as still images, movie shooting is generally performed using a resolution lower than that used for still image shooting. Also, auto focus control put a priority on a focus tracking ability, e.g., for a moving subject, over focus accuracy.

Therefore, in the case of shooting still images during movie shooting, applying the same auto focus control as during movie shooting is likely to result in images not well focused. Thus, it is preferable to perform an auto focus control for still image shooting.

When processing still image shooting during movie shooting, it is difficult to perform the two processes in a completely parallel manner. In reality, movie recording will be interrupted. Therefore, proposals have been made to minimize the interruption period of movie recording caused by the still image shooting process, or to suppress the unnaturalness of playback by generating images for the interruption period from other frames.

For instance, Japanese Patent Laid-Open No. 2004-201282 proposes a method for reducing the interruption period of movie recording. To be more precise, a method is described where movie recording will be continued until a shutter button for still image shooting is fully pressed, even in the event that the shutter button is pressed halfway to perform auto focus control or automatic exposure control.

According to the method proposed in this literature, since movie recording is not interrupted until shooting actually occurs, the interruption period of movie recording can be reduced as compared to a case where pressing the shutter button halfway immediately interrupts movie recording. Even so, a problem remains where auto focus (AF) control or automatic exposure (AE) control for still image shooting performed upon halfway pressing of the shutter button affects the movie that is being continuously recorded.

In other words, AF control during still image shooting typically involves performing full-range scans between a near end and a far end with a focus lens to determine a focus position. This means that images obtained while driving the focus lens during the AF control will be included in the movie being continuously recorded. Therefore, when a photographer determines a desired shooting position or range by repeatedly halfway-pressing and releasing the shutter button, an out of focus moving image will be recorded every time the shutter button is pressed halfway. Thus, there was a problem where movie playback was visually undesirable.

SUMMARY OF THE INVENTION

The present invention has been made in light of such problems in the conventional art. The object of the present invention is to provide an image sensing apparatus and a control method therefor capable of reducing interruption periods of movie recording caused by still image recording, and capable of suppressing any influences exerted by the still image recording AF control over the movie.

According to an aspect of the present invention, there is provided an image sensing apparatus capable of recording still images during movie recording, comprising: automatic exposure control unit adapted to perform automatic exposure control processing for still image recording while continuously performing movie recording when an initiation instruction for a still image recording preparation process is issued during movie recording; and still image recording unit adapted to perform still image recording processing when an initiation instruction for still image recording processing is issued after the initiation instruction for a still image recording preparation process is issued; wherein the automatic exposure control unit performs exposure control using an aperture value at the time the initiation instruction for a still image recording preparation process was issued as a minimum aperture value.

According to an aspect of the present invention, there is provided a control method for an image sensing apparatus capable of recording still images during movie recording, comprising the steps of: controlling automatic exposure for still image recording while continuously performing movie recording when an initiation instruction for a still image recording preparation process is issued during movie recording; and recording still images when an initiation instruction for still image recording processing is issued after the initiation instruction for a still image recording preparation process is issued; wherein the step of controlling automatic exposure involves performing exposure control using an aperture value when the initiation instruction for a still image recording preparation process is issued as a minimum aperture value.

The above configurations allow the present invention to reduce the interruption period of movie recording caused by still image recording, and suppress the influences of the still image recording AF control over the movie.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

First Embodiment

Figure 2:
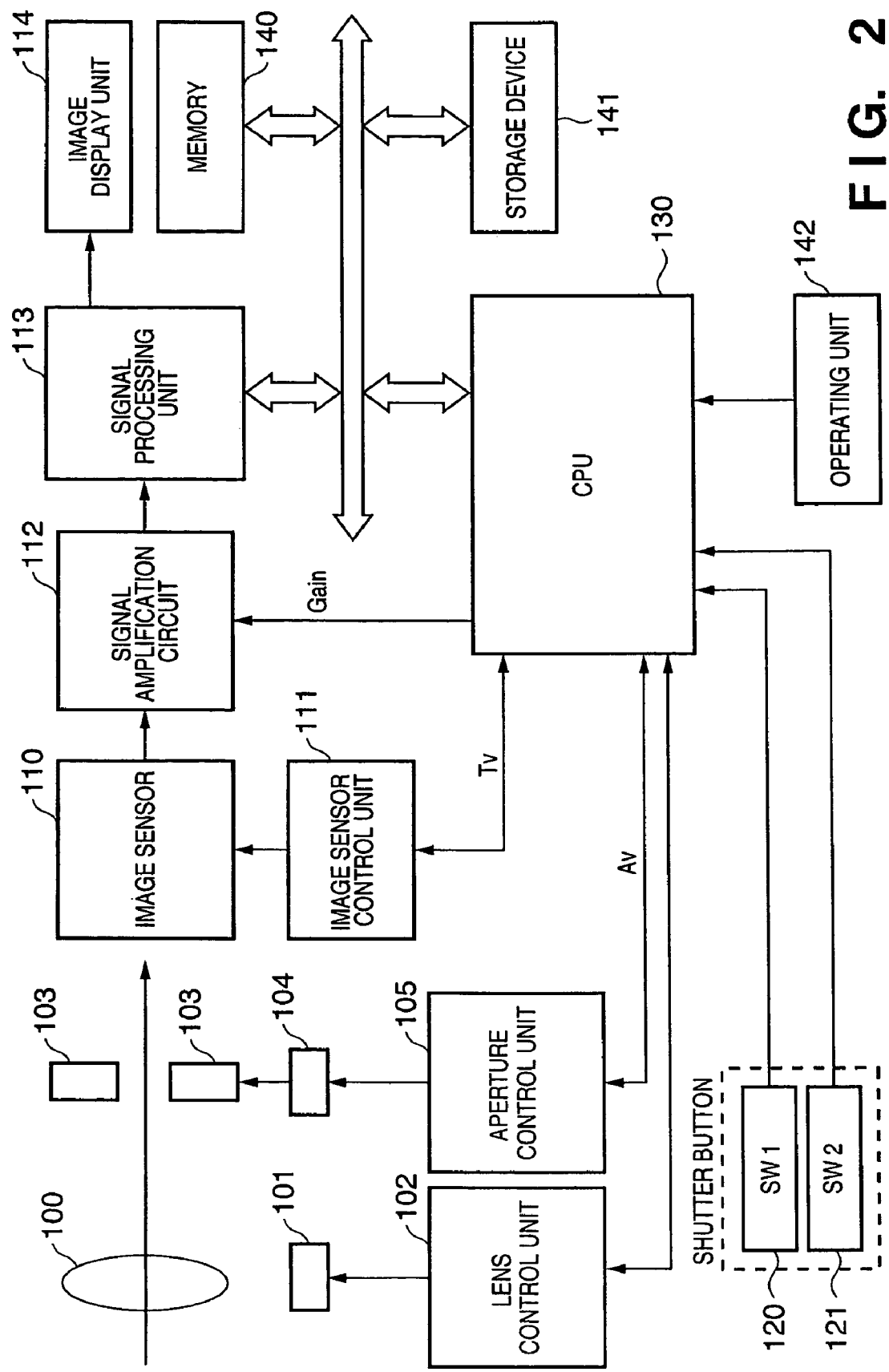
FIG. 2 is a block diagram depicting an exemplary configuration of an image sensing apparatus according to an embodiment of the present invention.

FIG. 2 is a block diagram depicting an exemplary configuration of a digital still camera as an image sensing apparatus according to an embodiment of the present invention. Incidentally, among the various configurations of the digital still camera, only a configuration related to processing of still image recording during movie recording is shown in FIG. 2.

In FIG. 2, reference numeral 100 denotes a lens, 101 denotes a drive motor of the lens 100, 102 denotes a lens drive unit that controls the drive motor 101, 103 denotes an aperture, 104 denotes a drive motor of the aperture 103, and 105 denotes an aperture control unit that controls the drive motor 104. An image sensor control unit 111 controls an electronic shutter that controls accumulation time of electrical charge at an image sensor 110 such as a CCD sensor or a CMOS sensor. In addition, the image sensor 110 is controlled according to various drive modes such as a still image shooting mode and movie shooting mode, or movie displaying modes such as an electronic viewfinder (EVF). Incidentally, depending on the configurations of the image sensor 110 or signal processing subsequently performed, the actual conditions of the movie shooting mode and the movie displaying mode may be the same.

Reference numeral 112 denotes a signal amplification circuit such as an AGC that alters gains of signals outputted from the image sensor, while 113 denotes a signal processing unit that performs A/D conversion, white balance processing, color generation processing, compression and encoding processing, and the like. An image display unit 114 typically comprises a flat color display device such as a LCD or an organic EL display, and displays images processed by the signal processing unit 113. The image display unit 114 is used as a display for the electronic viewfinder (EVF) function or during playback, or a display for displaying GUI during configuration of various settings. A CPU 130 controls the entire camera by executing a control program stored in, for instance, a memory 140, a storage device 141 or a nonvolatile memory, not shown.

Operation control during recording, which will be described later, is also performed primarily by the CPU 130 by controlling other components. Incidentally, at least a portion of the signal processing unit 113 may be implemented as a combination of the CPU 130 and control software.

Reference characters SW1 (120) and SW2 (121) denote switches that are turned on and off by pressing a shutter button. In the present embodiment, it is assumed that SW1 (120) is turned on when the shutter button is pressed halfway, and that SW2 (121) is turned on when the shutter button is fully pressed. In addition, the turning on of SW1 (120) is used as a preparation process initiation instruction of the still image recording, while the turning on of SW2 (121) is used as a still image recording process initiation instruction.

A memory 140 is, for instance, a RAM, and temporarily stores various data, or moving images and still images processed by the signal processing unit 113. At least a portion of the memory 140 may be a nonvolatile RAM. The memory 140 is also used as a work area for the CPU 130.

A storage device 141 is, for instance, a hard disk drive, an optical disk drive or a semiconductor memory card reader/writer, and may be configured to be detachable from the camera, or to be built into the camera, or a combination of both. In addition, the storage device may be configured as a communication card or the like that outputs data to external devices with data storing capabilities without storing data themselves.

An operating unit 142 comprises buttons for instructing initiation and termination of movie recording, a zoom lever (if the lens 100 is a zoom lens), cursor keys, select/execute keys and the like that are used by a user to issue various instructions or configure various settings to the camera. The shutter button also composes a part of the operating unit 142.

In a camera configured as described, light passing through the lens 100 is converted into an electric signal at the image sensor 110, and is inputted to the signal processing unit 113 via the signal amplification circuit 112. From the image signal, the signal processing unit 113 extracts data such as a luminance signal, a color signal or a Q factor, and performs automatic exposure (AE) control, automatic white balance (AWB) control or auto focus (AF) control.

The CPU 130 initiates exposure control.

First, as for aperture control, the CPU 130 provides an aperture value (hereinafter referred to as Av) to the aperture control unit 105, which in turn controls the drive motor 104 to open and close the aperture 103 according to the aperture value.

Control of electronic shutter speed is achieved with the CPU 130 providing an electronic shutter speed value (hereinafter referred to as Tv) to the image sensor control unit 111, which in turn controls the electronic shutter speed. The amount of electrical charge accumulated at the image sensor 110 is controlled by altering the electronic shutter speed.

The CPU 130 controls the gain of the signal amplification circuit 112 by providing a gain value (hereinafter referred to as gain). Recently, there have been many cases where an A/C converter is built into the signal amplification circuit 112. In such cases, A/D conversion is performed at the signal amplification circuit 112 instead of the signal processing unit 113.

In auto focus control, signals inputted to the signal processing unit 113 are measured by moving the focus lens included in the lens 100 by means of the lens control unit 102 and the lens drive motor 101 within a predetermined range. The lens position at which the high frequency component of a luminance signal obtained from the image sensor 110 reaches maximum is searched as the focus position.

Automatic exposure control is performed by extracting from an image signal inputted to the signal processing unit 113 a luminance level signal indicating the luminance signal level at that point, and controlling aperture, shutter speed and gain so that the luminance level signal reaches a predetermined value.

The signal processing unit 113 generates color image data based on the signal from the image sensor 110, and enables the image display unit 114 to function as an electronic viewfinder by sequentially displaying the color images on the image display unit 114. In addition, the signal processing unit 113 performs compression and encoding on color images, and outputs such images after converting them into formats suitable for video output.

The compressed and encoded image is temporarily stored in the memory 140, and afterwards written into the storage device 141.

Incidentally, when the number of pixels of the image sensor 110 or the image data volume generated by the image processing unit 113 reaches significant levels, memory (not shown) built into the signal processing unit 113 or the CPU 130 may be utilized. In addition, by adjusting signal processing speed, data and information may be directly outputted to the storage device 141 or the image display unit 114 without passing through memory 140.

(Movie Recording Processing)

Figure 1:
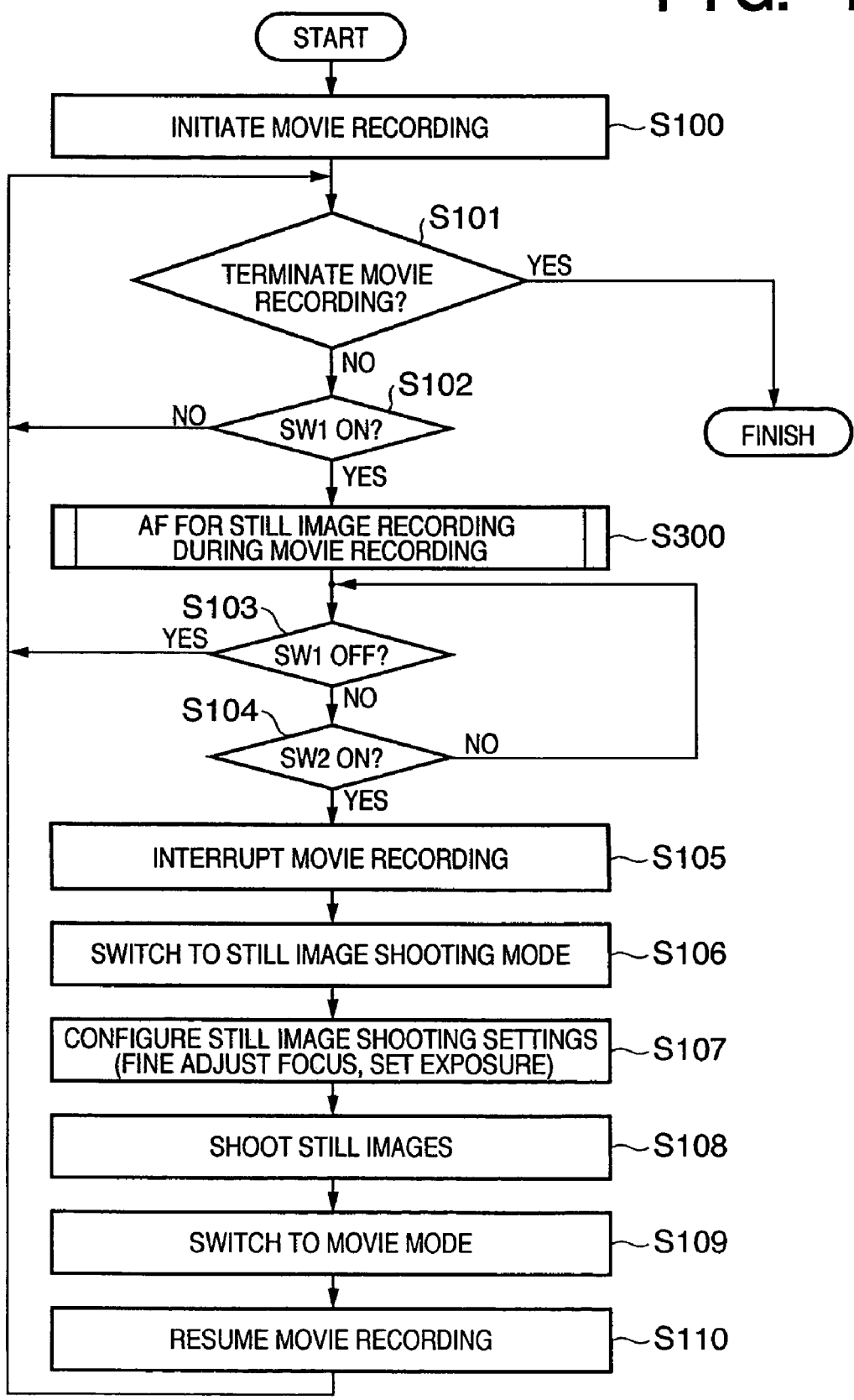
FIG. 1 is a flowchart for explaining an operation of movie recording of an image sensing apparatus according to a first embodiment of the present invention.

Next, a process for movie recording of a camera according to the present embodiment will be described using the flowchart shown in FIG. 1.

First, movie recording is initiated in response to a movie recording initiation instruction from, for instance, the operating unit 142 (step S100).

The process then detects whether an operation for movie termination has been performed (step S101). If so, movie recording is terminated.

In addition, the process checks whether the shutter button has been pressed halfway during movie recording by judging the status of SW1 (120) (step S102). If SW1 (120) has been turned on, the process proceeds to step S200 to initiate still image recording preparations. Otherwise, the process returns to step When the process detects that SW1 (120) has been turned on, AF control processing for still image recording is performed while continuing movie recording (step S300).

In the AF control processing for still image recording during movie recording, focus detection is performed within a scan range (subject distance range) that is narrower than in the case of AF control performed in normal still image recording mode. As described above, in normal still image recording mode, a full scan was performed, which involved driving a focus lens across the full range between a nearest end and infinity. In contrast, in the present embodiment, when pressing the shutter button halfway during movie recording to perform AF control for still image recording, the focus lens is driven in a narrower range compared to normal still image recording mode.

This reduces the time required to record out of focus images compared to performing a full scan, and suppresses their influences over the movie being continuously recorded. Generally, while advantageous effects of the present invention may be achieved by driving the focus lens in a range that is narrower in comparison to the case of normal still image recording mode, an example of more specific control contents will be described below.

Figure 8:
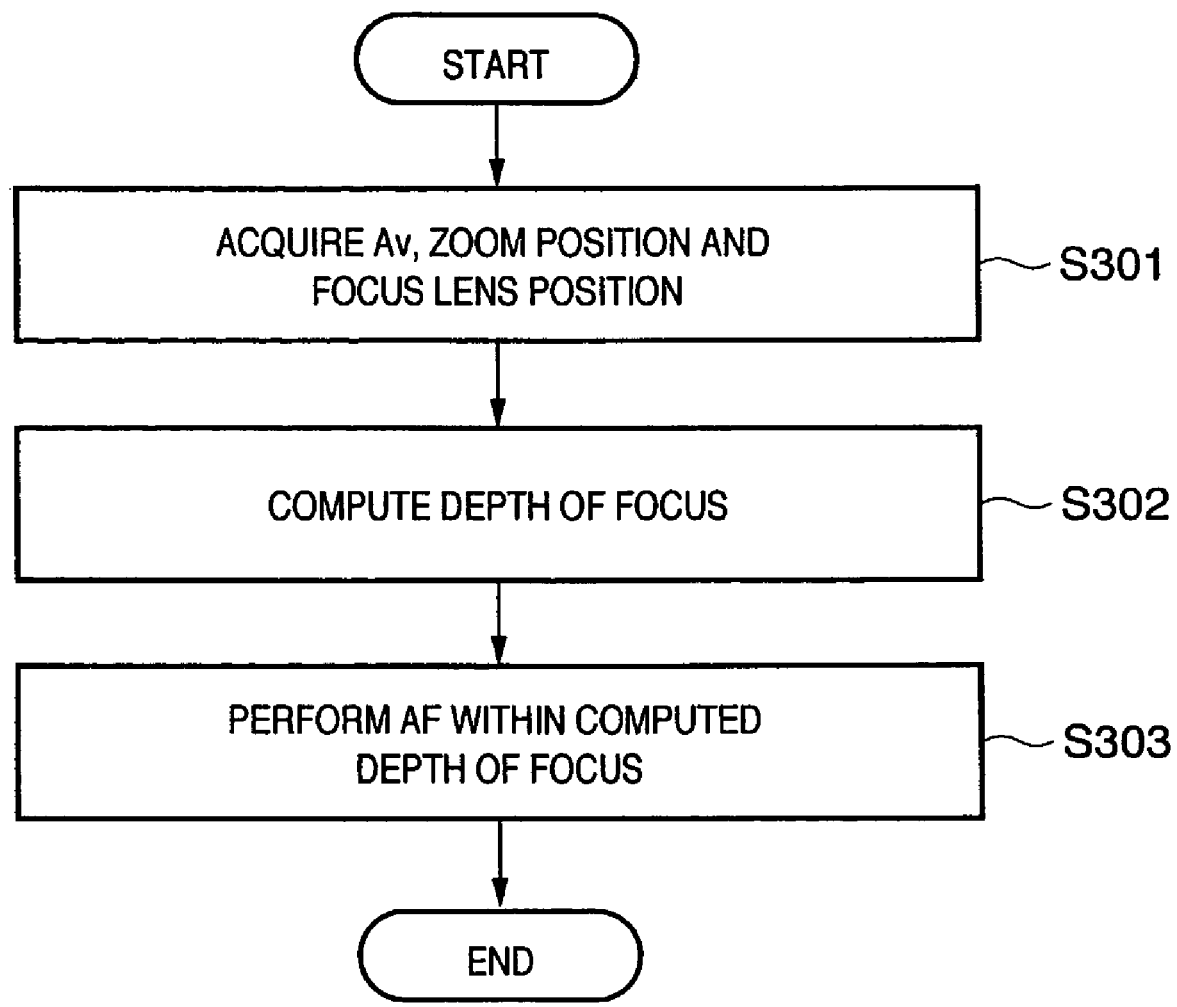
FIG. 8 is a flowchart for explaining details of AF processing for still image recording during movie recording according to an embodiment of the present invention.

A first example of the AF processing of step S300 for still image recording during movie recording will be further explained using the flowchart shown in FIG. 8.

First, auto focus control during movie recording will be explained. Auto focus control during movie recording can be roughly divided into micro drive AF mode, hill-climb AF mode, and lens stop.

Micro drive AF mode is a operating mode that performs focus determination, determination of direction of focus position, and focus adjustment of short distances by moving the focus lens over a minute distance and comparing the AF evaluated values of the positions before and after the movement.

More precisely, in this mode, after comparing the AF evaluated values of the positions before and after movement, the focus lens is driven in the same direction if the AF evaluated value has increased and is driven in the opposite direction if the AF evaluated value has decreased, thereby repeatedly performing adjustment over a minute range. If a predetermined number of movements successively occur in the same direction, it is assumed that the distance has changed significantly due to reasons such as a movement of the subject, and a transition is made to hill-climb AF mode.

On the other hand, when repetitive wobbling occurs consecutively over a predetermined amount of time in an area that can be regarded as being the same (within a predetermined depth of focus for movies), it is determined that the lens is in focus, and the focus lens is moved to the peak position of the AF evaluated value to make a transition to lens stop.

Assume that SW1 (120) is turned on while such auto focus control during movie recording is in progress. In this case, the CPU 130 acquires a value of the aperture 103 Av, as well as a zoom position (lens focus distance f) and a focus lens position of the lens 100 of the point in time that SW1 (120) was turned on from the aperture control unit 105 and the lens control unit 102 (Step S301).

A depth of focus of the current shooting condition is computed from the aperture value Av and the diameter of a predetermined allowable minimum circle of confusion δ during movie recording (step S302). Next, using the current focus lens position as a reference, still image AF control is performed where the drive range of the focus lens is within the computed depth of focus (step S303).

Since the lens is observed to be in focus within the depth of focus, AF control performed by driving the focus lens within this range will not influence the movie being recorded. As we have seen, by adjusting the focus lens drive range of AF for recording still images during movie recording to be within the depth of focus upon movie recording, theoretically, influences of AF processing for recording still images during movie recordings over movies no longer exist.

Alternatively, in step S303, the range can be set to±depth of focus while using the current focus lens position as a reference. In this case, the focus lens will be slightly driven to portions not within the current depth of focus. Nevertheless, the range remains significantly narrower than a full scan, and since AF control is performed in the vicinity of the area regarded to be in focus for the current movie shooting, influences over the movie currently being recorded are substantially negligible.

The focus lens drive range of step S303 may be arbitrarily determined as to how much influence over movies can be tolerated when narrowing the range from a full scan, depending on movie and still image resolutions.

As seen, the present embodiment configures an AF scan range so that the following is true:

AF scan range for still image mode>AF scan range for still image recording during movie recording>AF scan range for movie mode Returning to FIG. 1, in step S103, when SW1 (120) is turned off before SW2 (121) is turned on (when the shutter button is returned to its original state), the process returns to step S101. When SW1 (120) remains turned on, the process determines whether the shutter button has been fully pressed (whether SW2 (121) has been turned on) (step S104). If SW2 (121) has not been turned on, the process returns to step S103.

On the other hand, if SW2 (121) has been turned on, movie recording is interrupted (step S105), and the drive mode of the image sensor is switched to still image recording mode (step S106). Configuration of still image recording settings such as changing exposure for still image recording or fine adjustment of focus position is then performed (step S107). With some image sensors, the sequence of steps S106 and S107 may be reversed.

Next, still image recording processing is performed (step S108), and after an exposed image is read out from the image sensor, the drive mode of the image sensor returns to movie mode (step S109), thereby resuming movie recording (step S110).

The relationship between shutter button status and recording operations of a camera according to the present embodiment will now be explained using FIGS. 3 and 4.

In order to clarify the difference between operations involving the same shutter button operations, both an operation by a conventional camera where movie recording is interrupted every time SW1 (120) is turned on (FIG. 3), and an operation by a camera according to the present embodiment (FIG. 4) are provided.

Figure 3:
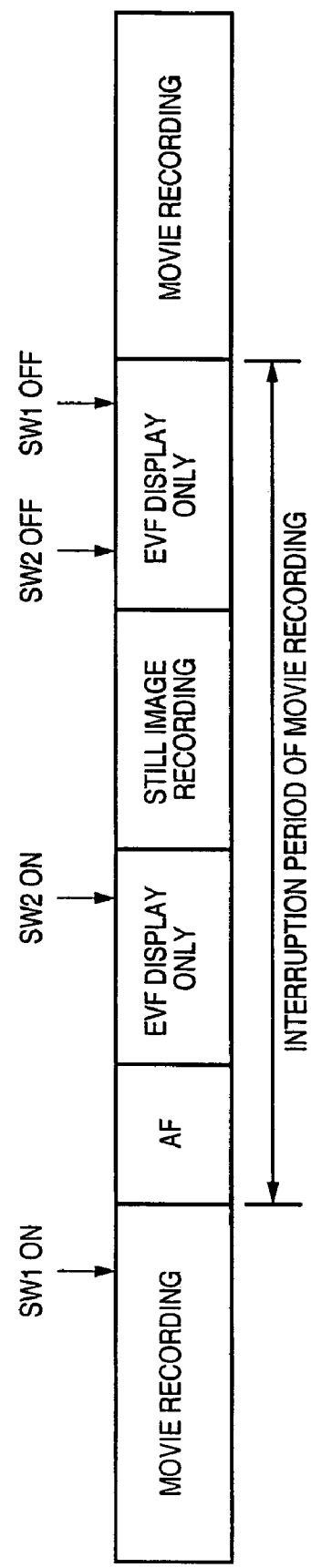
FIG. 3 is a timing chart for explaining an operation of still image recording during movie recording of a conventional image sensing apparatus.
Figure 4:
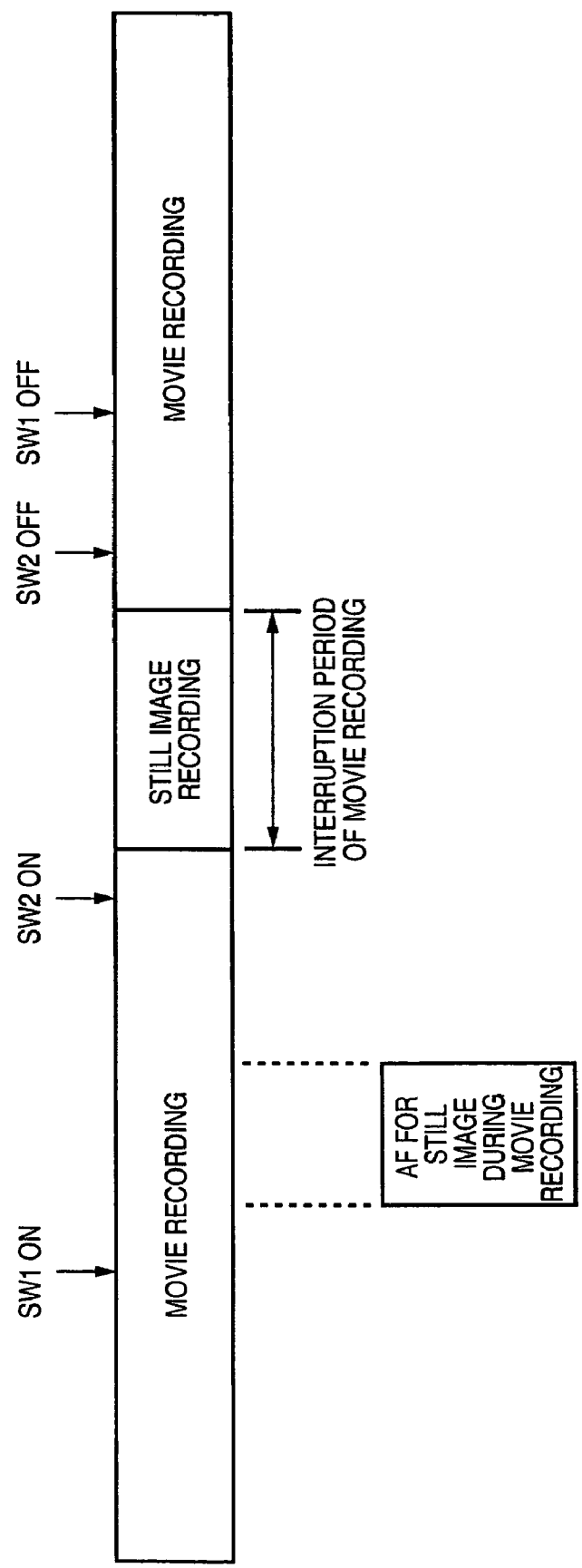
FIG. 4 is a timing chart for explaining an operation of still image recording during movie recording of an image sensing apparatus according to an embodiment of the present embodiment.

With a conventional camera shown in FIG. 3, movie recording is terminated when SW1 is turned on, and, for instance, EVF display is performed until AF control for recording still image is performed and SW2 is turned on. When SW2 is turned on, processing of still image shooting and recording is performed. When SW2 is turned off, and SW1 is subsequently turned on, movie recording is resumed. In summary, movie recording is terminated between the time that SW1 is turned on to the time that SW1 is turned off.

Meanwhile, with the present embodiment, AF processing for still image recording during movie recording is performed when SW1 is turned on. However, since movie recording is not interrupted until SW2 is turned on, it is apparent that the interruption period of movie recording is significantly reduced.

Figure 5:
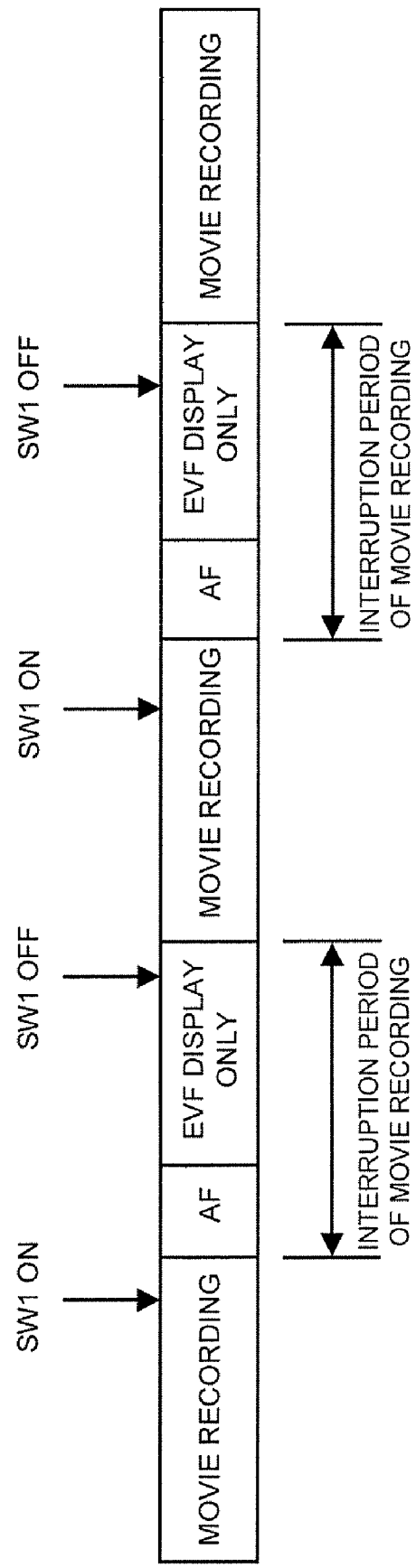
FIG. 5 is a timing chart for explaining an operation of still image recording during movie recording of a conventional image sensing apparatus.
Figure 6:
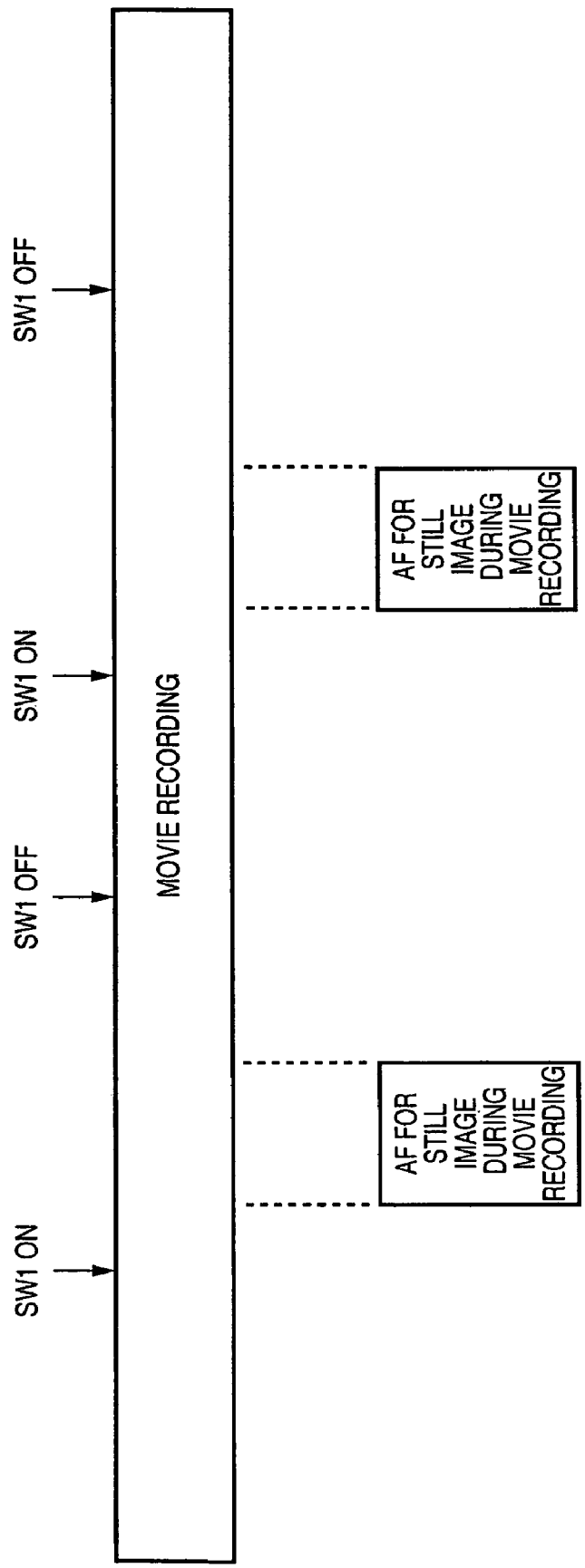
FIG. 6 is a timing chart for explaining an operation of still image recording during movie recording of an image sensing apparatus according to an embodiment of the present embodiment.

An operation in the case of repetitively turning on and off SW1 will be illustrated in FIGS. 5 and 6. FIG. 5 shows a case where the same control as in FIG. 3 is performed, while FIG. 6 shows a case where a control according to the present embodiment is performed.

In the example of the conventional art shown in FIG. 5, when SW1 is turned on, movie recording is terminated while still image AF processing and EVF display are performed, thereby entering a standby state for still image shooting. Movie recording is resumed when SW1 is turned off without turning on SW2. When SW1 is subsequently turned on again, the same processing is performed to enter a standby state for still image shooting. As seen, repetitive halfway pressing and releasing of the shutter button without performing actual shooting may result in recording a movie with poor continuity.

In contrast, as shown in FIG. 6, since the present embodiment does not terminate movie recording until SW2 is turned on, movie recording will not be terminated.

As explained above, according to the present embodiment, in an image sensing apparatus capable of recording still images during movie recording, since movie recording is concurrently continued even during auto focus control for still image recording during movie recording, interruption of movie recording can be minimized. In addition, the drive range of the focus lens of auto focus control for still image recording during movie recording is configured to be narrower than the focus lens drive range of auto focus control for normal still image recording. Therefore, it is possible to suppress influences over the movie being recorded concurrently.

<AE Processing>

AE processing for recording still images during movie recording will now be explained.

Figure 7:
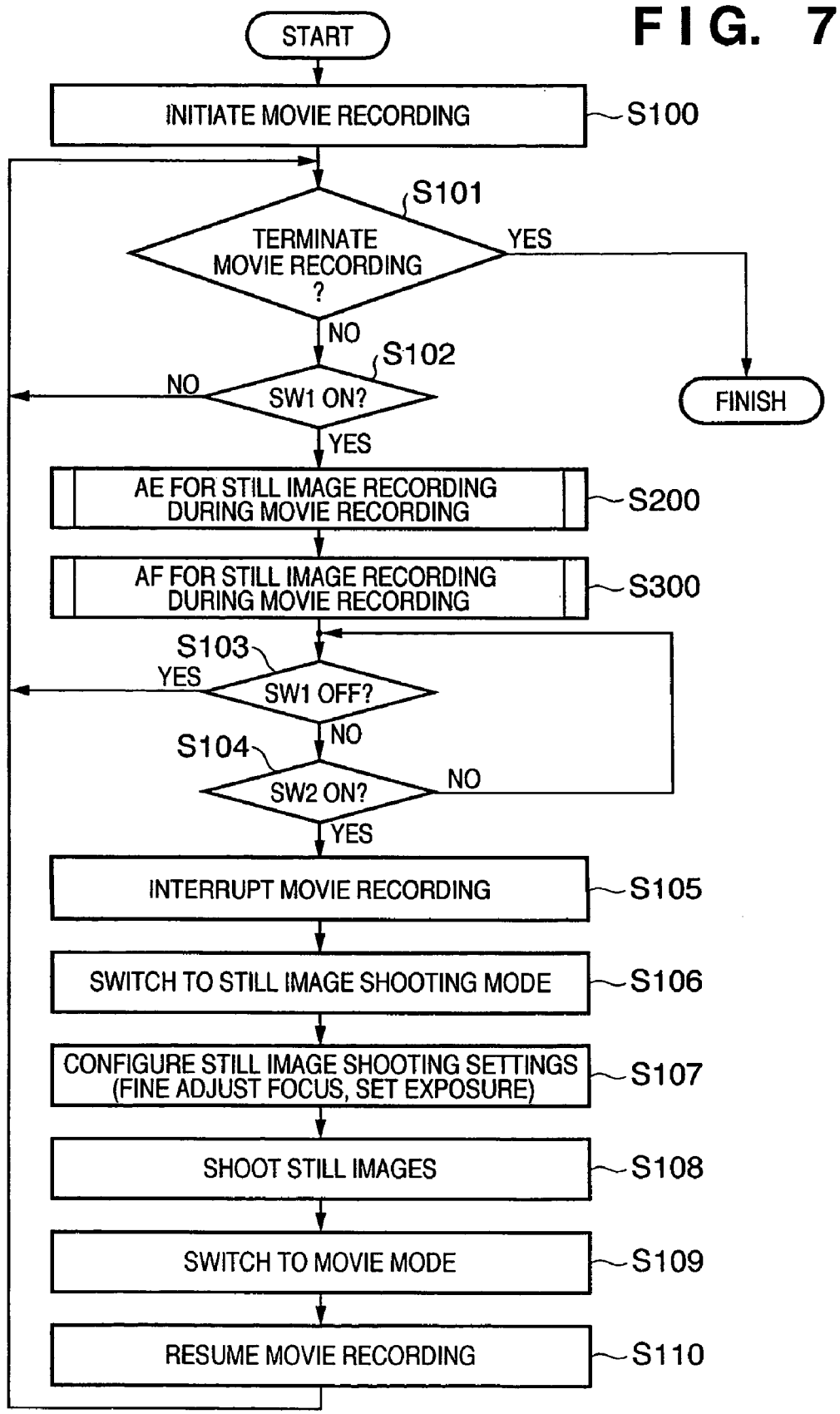
FIG. 7 is a flowchart for explaining an operation of movie recording of an image sensing apparatus according to an embodiment of the present invention.

FIG. 7 is a flowchart for explaining processing for movie recording with a camera according to the present embodiment. Steps involving the same processing as those shown in FIG. 1, are attached with like reference characters, and will not be explained. The process hereof differs from that of FIG. 1 in that AE processing for recording still images during movie recording (step S200) is performed prior to performing AF processing for recording still images during movie recording. Moreover, depending on the shooting sequence, the step may be performed subsequent to the AF processing for recording still images during movie recording, or performed in parallel.

Figure 9:
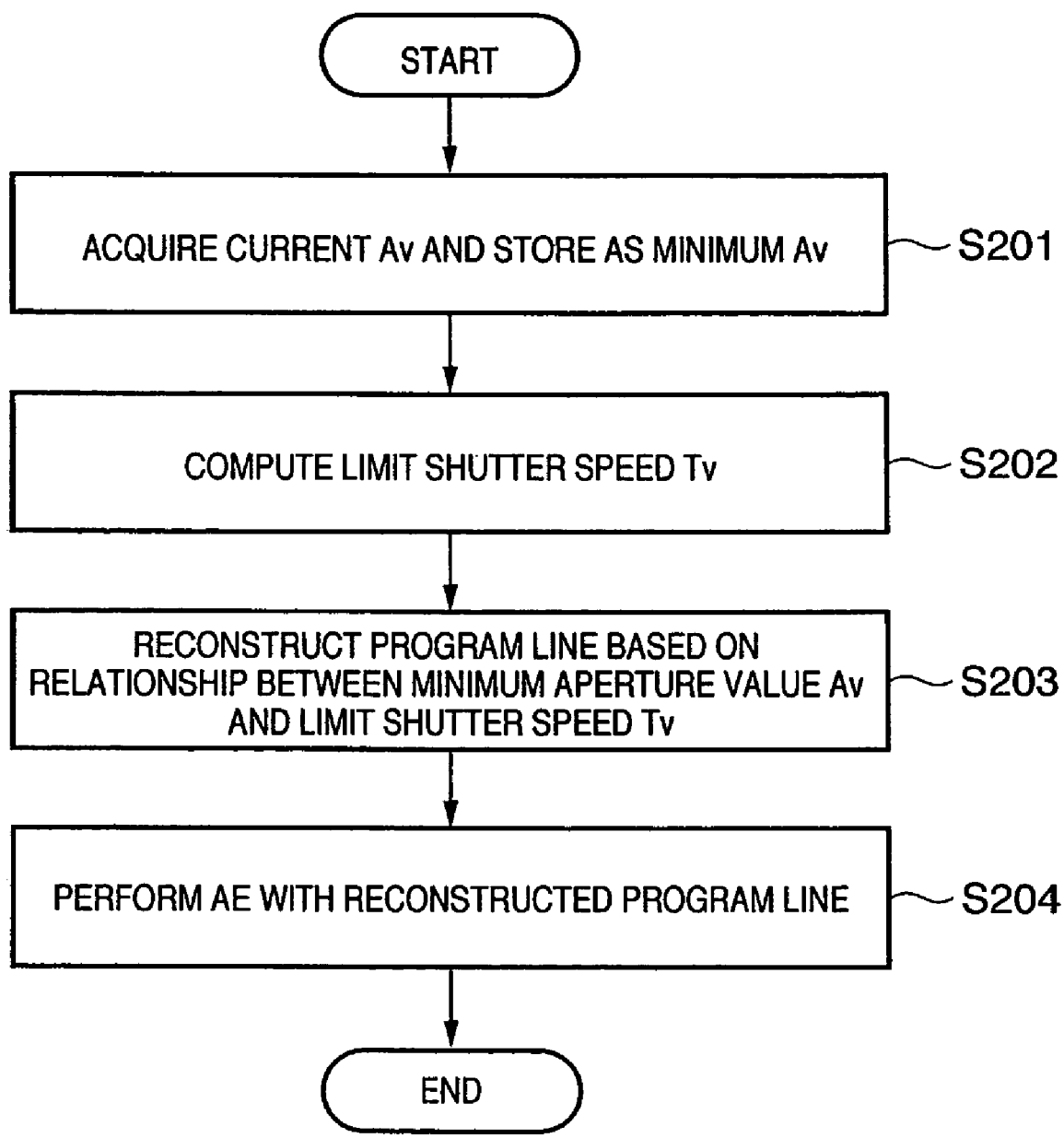
FIG. 9 is a flowchart for explaining details of AE processing for still image recording during movie recording according to an embodiment of the present invention.

FIG. 9 is a flowchart for providing a detailed description of the AE processing performed in step S200 of FIG. 7.

The CPU 130 first acquires a current aperture value Av from the aperture control unit 105. The aperture value Av is configured and stored as a minimum aperture value for the AE processing to be subsequently performed (step S201).

A limit shutter speed Tv is then derived (step S202), and a program line as an exposure program is reconstructed from the relationship between the minimum aperture value Av and the limit shutter speed Tv (step S203). This reconstruction controls the aperture so as not to open larger than during the depression of SW1. The reconstructed program line is used to perform exposure control (step S204). The exposure program is a program that defines parameters for controlling an exposure, i.e., an aperture value, a shutter speed, a gain, etc., based on the result of a photo metering.

As seen, according to the present embodiment, the AE processing for recording still images during movie recording performs AE control so that the aperture does not move towards its open side. Therefore, shallow depths of focus are avoided, thereby making it possible to reduce the possibility of the AF processing for recording still images during movie recording influencing the movie.

In addition, by concurrently performing the AF control and the AE control described above, both movie recording and still image recording can be performed appropriately even when recording still images during movie recording.

Other Embodiments

The present invention also encompasses cases where the same functions achieved by the software program of the abovementioned embodiments are achieved by either executing the program directly from a recording media, or by supplying the program to an image sensing apparatus having a program executable computer via wired/wireless communication, and having the image sensing apparatus execute that program.

Therefore, the program codes themselves, to be supplied and installed to a computer in an image sensing apparatus to enable the computer to achieve the functions and processing of the present invention, may also implement the present invention. In other words, the computer programs themselves for implementing the functions and processing of the present invention are also encompassed in the present invention.

In this case, as long as program functions are retained, the program may take any form, including an object code, an interpreter-executable program, or a script data supplied to an OS.

Recording media to which the program is supplied may include, for instance, magnetic recording media such as a flexible disk, a hard disk or a magnetic tape, optical/magnetooptical storage media such as a MO, a CD-ROM, a CD-R, a CD-RW, a DVD-ROM, a DVD-R or a DVD-RW, and a nonvolatile semiconductor memory or the like.

When the image sensing apparatus is capable of connecting to a computer network, examples of the wired/wireless communication method for supplying the program shall include storing a data file that may act as a computer program (program data file) that forms the present invention, such as the computer program itself that forms the present invention on a server on the computer network, or a compressed file with an auto-install function and the like, on an embodied apparatus and downloading the program data file onto an embodied apparatus that establishes connection. In this case, it is also possible to divide the program data file into a plurality of segment files, and allocating the segment files on different servers.

The embodied apparatus may also be directly connected to an external computer for downloading a software program that forms the present invention into a nonvolatile memory inside the embodied apparatus from the external computer.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-123985, filed on Apr. 21, 2005 which is hereby incorporated by reference herein in its entirety.

What is claimed is:

1. An image sensing apparatus capable of recording still images during movie recording, comprising:
   an automatic exposure control unit adapted to perform an aperture value control processing for movie recording and to perform an aperture value control processing for still image recording when an initiation instruction for a still image recording preparation process is issued during the movie recording; and
   an image recording unit adapted to perform still image recording processing while continuously performing movie recording when an initiation instruction for still image recording processing is issued after the initiation instruction for a still image recording preparation process is issued,
   wherein the automatic exposure control unit performs the aperture value control processing for still image recording using an aperture value, which is being used for movie recording at the time when the initiation instruction for a still image recording preparation process was issued, as a minimum aperture value used for the aperture value control processing for still image recording.

2. The image sensing apparatus according to claim 1, wherein the automatic exposure control unit reconstructs an exposure program according to an aperture value upon detecting the preparation process initiation instruction and a limit shutter speed, and performs the aperture control processing based on the reconstructed exposure program.

3. The image sensing apparatus according to claim 1, further comprising:
   an auto focus control unit adapted to perform auto focus control processing for still image recording while continuously performing movie recording when an initiation instruction for a still image recording preparation process is issued during movie recording, wherein
   the auto focus control unit performs focus detection within a distance range that is narrower than the distance range during auto focus control performed for still image recording when movie recording is not in progress, when the initiation instruction for the still image recording preparation process is issued.

4. The image sensing apparatus according to claim 1, wherein the still image recording unit interrupts movie recording to perform still image recording processing when an initiation instruction for still image recording processing is issued after an preparation process initiation instruction is issued.

5. A control method for an image sensing apparatus for recording still images during movie recording, comprising:
   controlling an aperture value for movie recording and an aperture value for still image recording when an initiation instruction for a still image recording preparation process is issued during movie recording; and
   recording still images while continuously performing movie recording when an initiation instruction for still image recording processing is issued after the initiation instruction for a still image recording preparation process is issued,
   wherein the controlling the aperture value for still image recording uses an aperture value, which is being used for movie recording at the time when the initiation instruction for a still image recording preparation process is issued, as a minimum aperture value used for controlling the aperture value for still image recording.

* * * * *